(12) United States Patent
Gu

(10) Patent No.: US 10,819,017 B2
(45) Date of Patent: Oct. 27, 2020

(54) ANTENNA SYSTEM AND MOBILE TERMINAL

(71) Applicant: AAC Technologies Pte. Ltd., Singapore (SG)

(72) Inventor: Haichuan Gu, Shenzhen (CN)

(73) Assignee: AAC Technologies Pte. Ltd., Singapore (SG)

( * ) Notice: Subject to any disclaimer, the term of this patent is extended or adjusted under 35 U.S.C. 154(b) by 0 days.

(21) Appl. No.: 16/527,074

(22) Filed: Jul. 31, 2019

(65) Prior Publication Data

US 2020/0044315 A1 Feb. 6, 2020

(30) Foreign Application Priority Data

Aug. 3, 2018 (CN) ............................ 2018 1 0876533

(51) Int. Cl.
*H01Q 1/24* (2006.01)
*H01Q 9/42* (2006.01)
*H04B 7/0413* (2017.01)
*H01Q 21/28* (2006.01)
*H01Q 9/26* (2006.01)

(52) U.S. Cl.
CPC .............. *H01Q 1/243* (2013.01); *H01Q 9/26* (2013.01); *H01Q 9/42* (2013.01); *H01Q 21/28* (2013.01); *H04B 7/0413* (2013.01)

(58) Field of Classification Search
CPC .......... H01Q 1/243; H01Q 9/42; H01Q 21/28; H01Q 9/26; H01Q 5/35; H01Q 5/328; H01Q 5/335; H01Q 5/378; H01Q 1/22; H01Q 1/2258; H01Q 1/242; H01Q 1/36;
(Continued)

(56) References Cited

U.S. PATENT DOCUMENTS

2019/0027833 A1* 1/2019 Ayala Vazquez ........ H01Q 1/48
2019/0058781 A1* 2/2019 Hong ..................... H01Q 1/243
(Continued)

FOREIGN PATENT DOCUMENTS

CN 204947066 B1 1/2016
CN 105742812 A1 7/2016
(Continued)

OTHER PUBLICATIONS

1st Office Action dated Dec. 4, 2019 by SIPO in related Chinese Patent Application No. 201810876533.4 (9 Pages).

*Primary Examiner* — Renan Luque
(74) *Attorney, Agent, or Firm* — W&G Law Group LLP

(57) ABSTRACT

An antenna system and a mobile terminal are provided. The antenna system includes a metal frame, a mainboard received inside the metal frame, and a first feeding point, a second feeding point, a first grounding point and a second grounding point provided on the mainboard. The metal frame includes a bottom frame separated by the breach into a first radiation portion located at the bottom left corner and a second radiation portion located at the bottom right corner. A first antenna is formed by feeding of the first feeding point, a second antenna is formed by feeding of the second feeding point, a working frequency of the first antenna covers LTE low frequency, and the working frequencies of the first antenna and the second antenna cover LTE intermediate frequency and high frequency & 3.4-3.8 GHz & C frequency band.

17 Claims, 9 Drawing Sheets

(58) Field of Classification Search
CPC .. H01Q 1/44; H01Q 5/10; H01Q 5/28; H01Q 5/50; H04B 7/0413
See application file for complete search history.

(56) References Cited

U.S. PATENT DOCUMENTS

| | | | |
|---|---|---|---|
| 2019/0181552 A1* | 6/2019 | Lee | H01Q 13/10 |
| 2019/0393586 A1* | 12/2019 | Ayala Vazquez | H01Q 9/42 |
| 2020/0052377 A1* | 2/2020 | Zhou | H01Q 5/328 |
| 2020/0076057 A1* | 3/2020 | Leutheuser | H01Q 1/12 |
| 2020/0076058 A1* | 3/2020 | Zhang | H01Q 1/38 |
| 2020/0245481 A1* | 7/2020 | Yoon | H01Q 1/36 |

FOREIGN PATENT DOCUMENTS

| | | |
|---|---|---|
| CN | 107394347 A1 | 11/2017 |
| CN | 107437661 A1 | 12/2017 |
| CN | 108321501 A1 | 7/2018 |

* cited by examiner

ANTENNA SYSTEM AND MOBILE TERMINAL

TECHNICAL FIELD

The present disclosure relates to the field of communication technologies, and particularly, to an antenna system and a mobile terminal.

BACKGROUND

Along with the development of mobile communication technology, mobile phones, PADS, laptop computers and so on have gradually become electronic products indispensable in life, and all of such electronic products have been updated by adding an antenna system to become electrommunication products that have the communication functions. However, consumers are no longer satisfied with their application functions, and have higher requirements on the appearance of the electrommunication products. The electrommunication products that have a metal housing and a 3D glass screen have good texture and aesthetic feeling, and thus are popular among many consumers.

The trend regarding the lengths and thicknesses of mobile terminals, as well as the use of metal housings, occupy the room for the antenna to a certain extent, which makes higher requirements on the design of antennas. The designing of electrommunication products of a metal housing usually provides the antenna system externally, or prevents the antenna system from being surrounded by metal, for example leaving a slit at a metal side, to facilitate radiation of the antenna system. However, the antenna systems of such a design have a narrow band and a low efficiency. When facing the requirements on the reduced sizes and the functions such as multiple frequencies and multiple models of the mobile terminals, the antenna systems of the prior art cannot satisfy the requirements.

Therefore, it is necessary to provide a novel antenna system to solve the above problems.

BRIEF DESCRIPTION OF DRAWINGS

Many aspects of the exemplary embodiment can be better understood with reference to the following drawings. The components in the drawings are not necessarily drawn to scale, the emphasis instead being placed upon clearly illustrating the principles of the present disclosure. Moreover, in the drawings, like reference numerals designate corresponding parts throughout the several views.

DESCRIPTION OF EMBODIMENTS

The present disclosure will be further illustrated with reference to the accompanying drawings and the embodiments.

Figure 1:
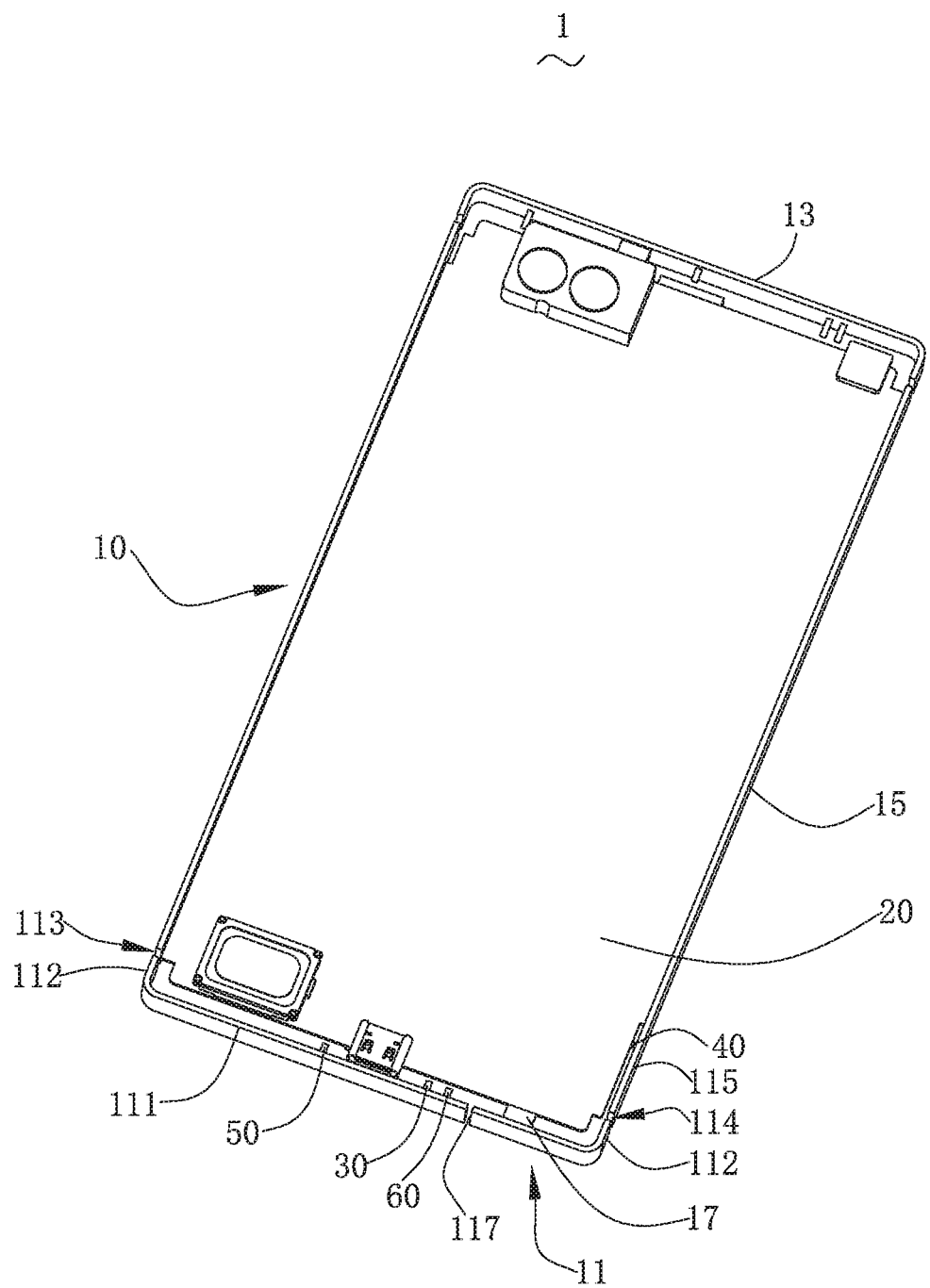
FIG. 1 is a schematic perspective structural diagram of an assembly of an antenna system provided by the present disclosure.
Figure 2:
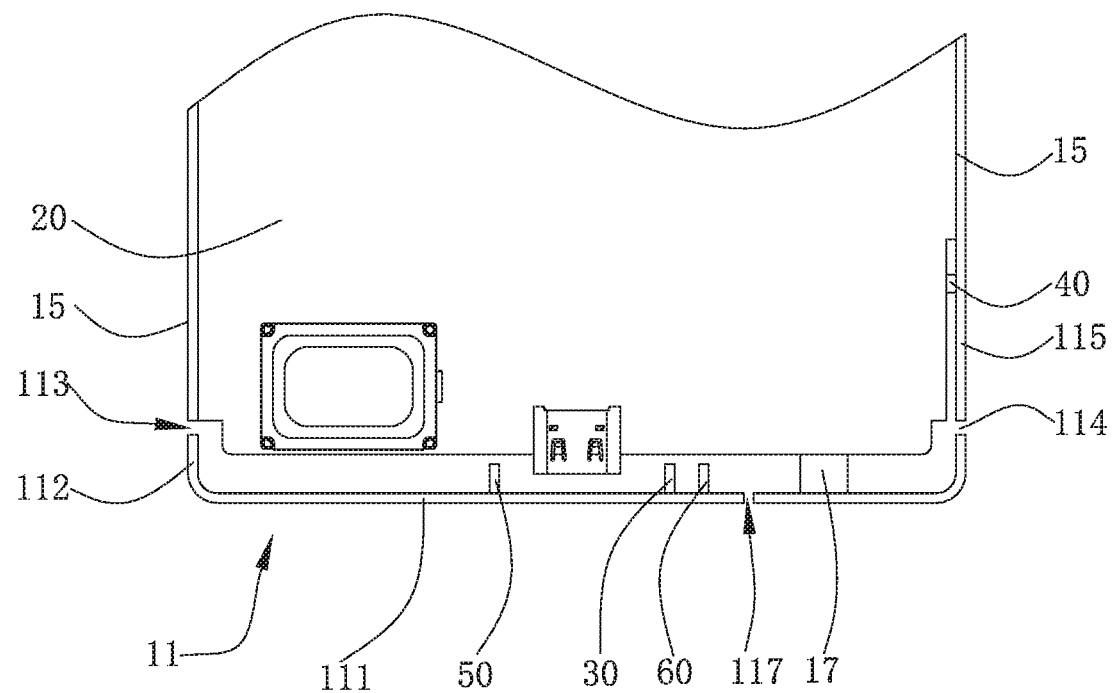
FIG. 2 is a schematic structural diagram of connection between the bottom frame of the antenna system shown in FIG. 1 and a circuit board.
Figure 3:
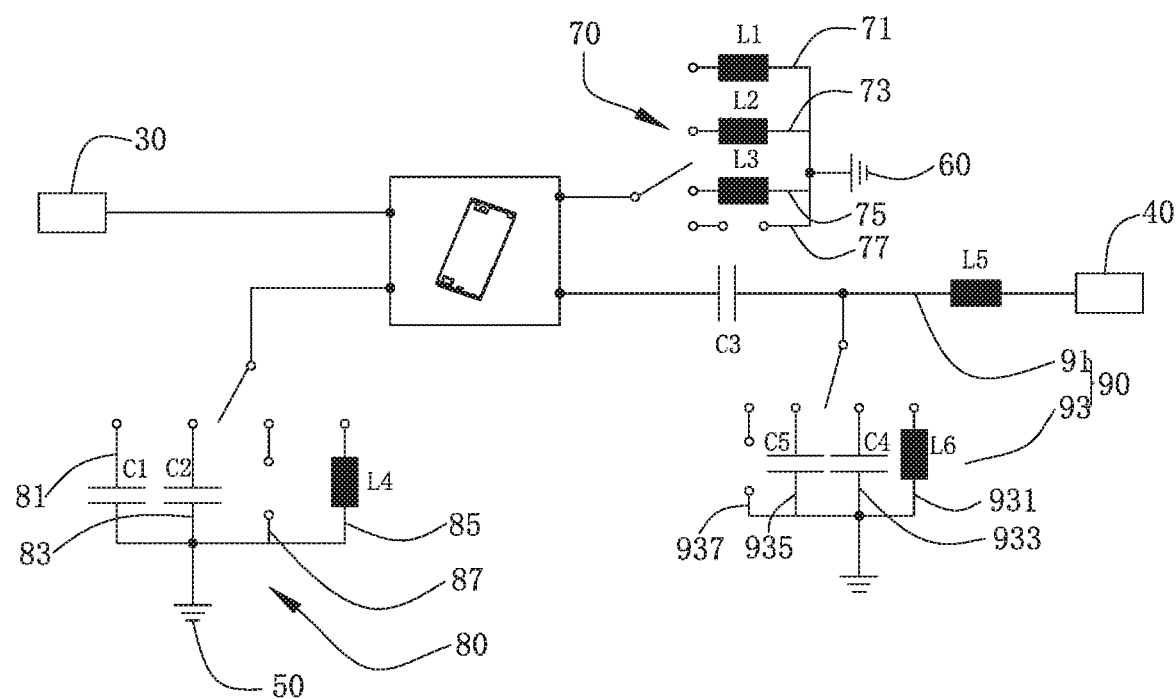
FIG. 3 is a schematic structural diagram of circuit connection of the antenna system shown in FIG. 1 according to an embodiment.

As shown in FIGS. 1-3, an embodiment of the present disclosure provides an antenna system 1, and the antenna system 1 can be applied to mobile terminals such as a mobile phone and a tablet personal computer. Generally, mobile terminals such as a mobile phone and a tablet personal computer are of a rectangular or rounded rectangular structure, which has a length direction and a width direction.

The antenna system 1 includes a metal frame 10, a mainboard 20 received in the metal frame 10, and a first feeding point 30, a second feeding point 40, a first grounding point 50, a second grounding point 60, a first tuning switch 70, a second tuning switch 80 and a matching network 90 provided on the mainboard 20.

The metal frame 10 includes a bottom frame 11, a top frame 13, two middle frames 15 with two ends respectively connected to the bottom frame 11 and the top frame 13, and a connecting rib 17 that connects the bottom frame 11 to the mainboard 20.

The bottom frame 11 and the top frame 13 are arranged opposite to each other, the bottom frame 11, the middle frames 15 and the top frame 13 are sequentially connected to enclose a complete structure of the metal frame 10, and all of the three surround the mainboard 20. Particularly, the bottom frame 11 is spaced apart from the mainboard 20 to form a clearance region, wherein the clearance region is ≤4 mm, and the bottom frame 11 and the mainboard 20 are connected by the connecting rib 17. The middle frames 15 and the mainboard 20 do not have a slit therebetween, and the inner side of the middle frames 15 is connected to an edge of the mainboard 20.

The bottom frame 11 includes a main frame 111, two side frames 112 that are bent and extend from the two ends of the main frame 111 respectively in the direction toward the middle frames 15, a first slit 113 and a second slit 114 that are respectively provided at the ends of the two side frames 112, an extension 115 that extends from one end of the second slit 114 facing away from the side frames 112 toward the middle frames 15 and a breach 117 provided on the main frame 111 and close to the second slit 114. The first slit 113 and the second slit 114 are arranged symmetrically about a symmetry axis parallel to the length direction of the metal frame 100. The side frames 112 arranged opposite to the extension 115 are spaced apart from the middle frames 15 to form the first slit 113. One end of the extension 115 is spaced apart from an adjacent side frame 112 to form the second slit 114, and the other end is connected to the middle frames 15. The spacing between the extension 115 and the mainboard 20 is less than the spacing e between the other parts of the bottom frame 11 and the mainboard 20. That is, the clearance region between the extension 115 and the mainboard 20 is smaller than the clearance regions between the other parts of the bottom frame 11 and the mainboard 20.

The portion of the bottom frame 11 that extends from the breach 117 to the first slit 113 is defined as a first radiation portion 101, and the portion of the bottom frame 11 that extends from the breach 117 to one end of the extension 115 facing away from the second slit 114 is defined as a second radiation portion 102.

Further, the clearance region between the bottom frame 11 and the mainboard 20, the first slit 113, the second slit 114 and the breach 117 are filled with a non-conductive material.

The first feeding point 30 is connected to a first position of the main frame 111, the first grounding point 50 is connected to a second position of the main frame 111, the second grounding point 60 is connected to a third position of the main frame 111, and the second feeding point 40 is connected to a fourth position of the extension 115. The first position is located between the second position and the third position, the second position is located between the first slit 113 and the first position and is close to the first position, the third position is located between the first position and the breach 117, and the connecting rib 17 is connected to the main frame 111 and is located between the breach 117 and the second slit 114.

The first feeding point 30 is electrically connected to first radiation portion 101, the second grounding point 60 is electrically connected to the first radiation portion 101 via a first tuning switch (SW1) 70, and the first grounding point 50 is electrically connected to the first radiation portion 101 via a second tuning switch (SW2) 80. The first radiation portion 101, the first feeding point 30, the first grounding point 50, the second grounding point 60, the first tuning switch (SW1) 70 and the second tuning switch (SW2) 80 together form a first antenna.

Further, the first tuning switch 70 has a first inductor-connected state 71, a second inductor-connected state 73, a third inductor-connected state 75 and an open-circuit state 77. Among them, when the first tuning switch 70 is in the first inductor-connected state 71, the second grounding point 60 is connected to the first radiation portion 101 via a first inductor L1; when the first tuning switch 70 is in the second inductor-connected state 73, the second grounding point 60 is connected to the first radiation portion 101 via a second inductor L2; when the first tuning switch 70 is in the third inductor-connected state 75, the second grounding point 60 is connected to the first radiation portion 101 via a third inductor L3; and when the first tuning switch 70 is in the open-circuit state 77, the second grounding point 60 is electrically isolated from the first radiation portion 101. The inductance values of the first inductor L1, the second inductor L2 and the third inductor L3 are respectively 1.5 nH, 2.2 nH and 5 nH.

Figure 4:
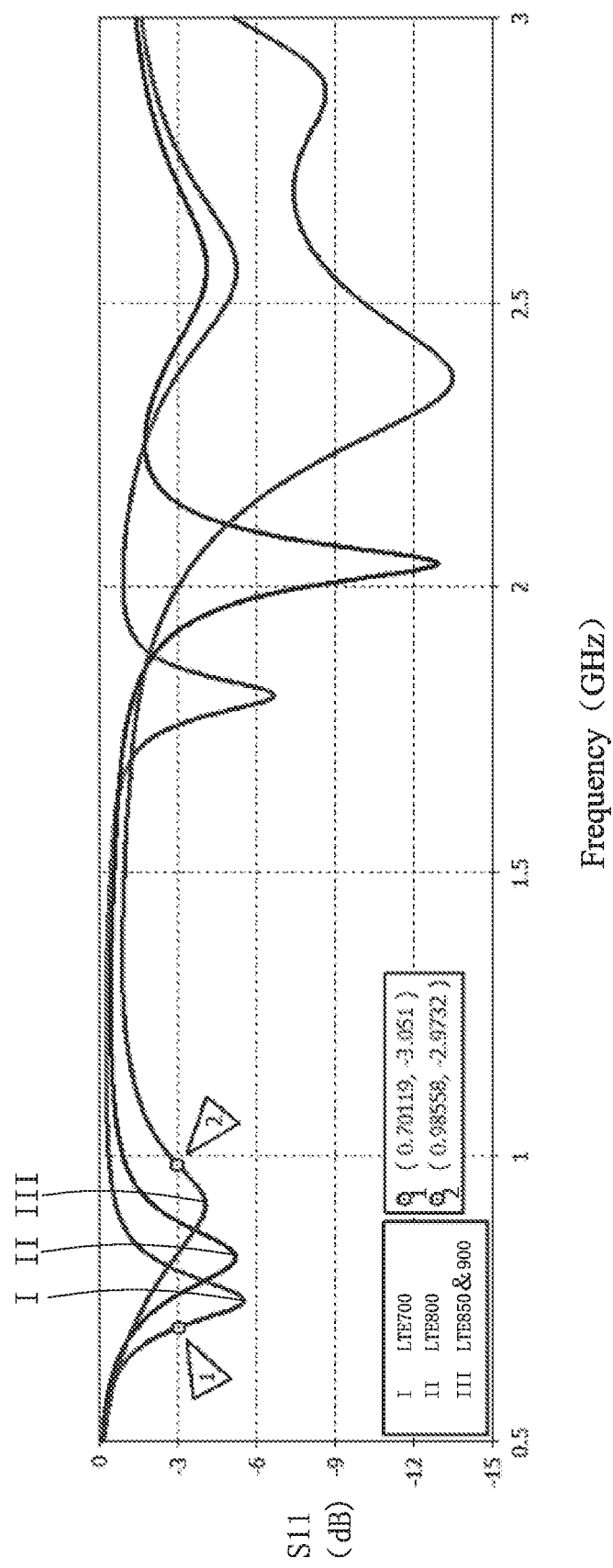
FIG. 4 is a curve diagram of simulation of low-frequency return loss of a first antenna in the antenna system provided by the present disclosure.
Figure 5:
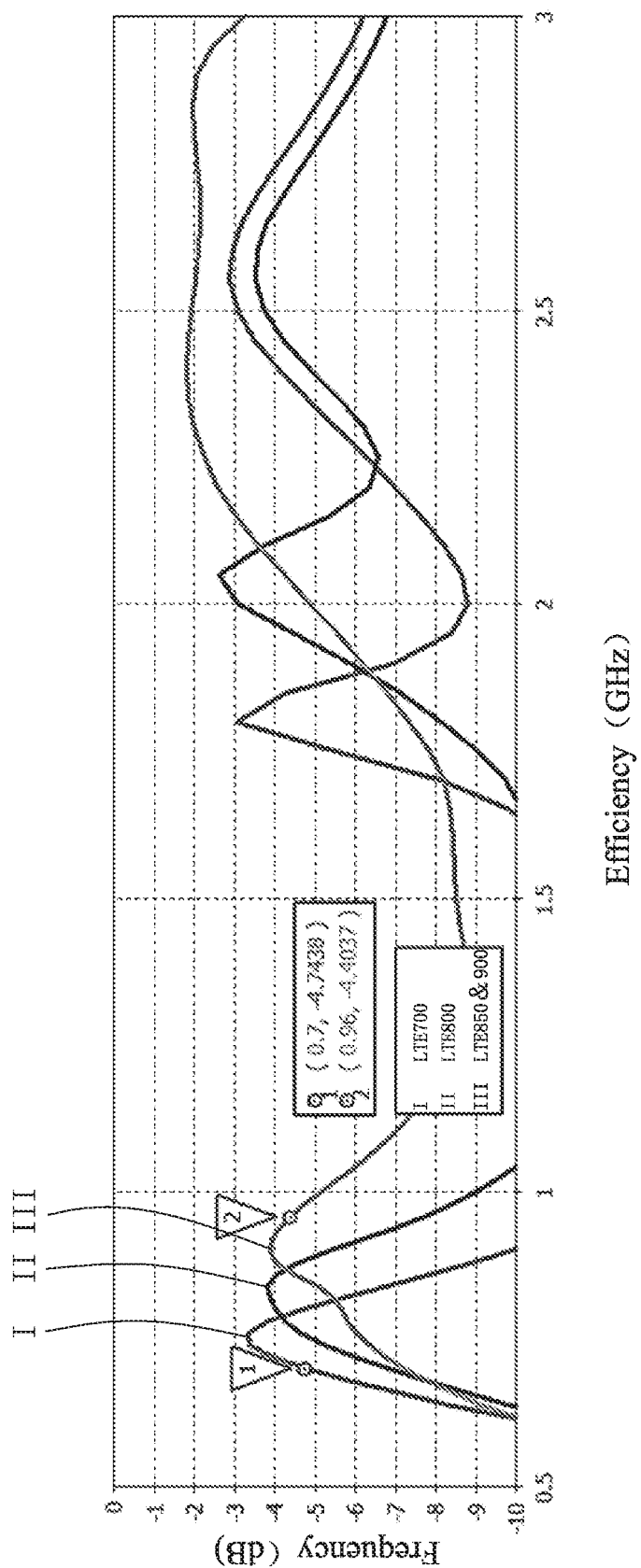
FIG. 5 is a curve diagram of simulation of low-frequency radiation efficiency of the first antenna in the antenna system provided by the present disclosure.

The second tuning switch (SW2) 80 has a first capacitor-connected state 81, a second capacitor-connected state 83, a fourth inductor-connected state 85 and an open-circuit state 87. Among them, when the second tuning switch 80 is in the first capacitor-connected state 81, the first grounding point 50 is connected to the first radiation portion 101 via a first capacitor C1; when the second tuning switch 80 is in the second capacitor-connected state 83, the first grounding point 50 is connected to the first radiation portion 101 via a second capacitor C2; when the second tuning switch 80 is in the fourth inductor-connected state 85, the first grounding point 50 is connected to the first radiation portion 101 via a fourth inductor L4; and when the second tuning switch 80 is in the open-circuit state 87, the first grounding point 50 is electrically isolated from the first radiation portion 101. The first capacitor C1 and the second capacitor C2 are constant-value capacitors, the capacitance values of which are respectively 1.5 pF and 0.8 pF, and the inductance value of the fourth inductor L4 is 2.2 nH. In this embodiment, the return loss and the efficiency in the low frequency band of the first antenna are as shown in FIGS. 4 and 5.

The second feeding point 40 is electrically connected to the second radiation portion 102 via the matching network 90, and the second radiation portion 102 is grounded via the connecting rib 17. The second radiation portion 102, the second feeding point 40, the matching network 90 and the connecting rib 17 together form a second antenna.

The matching network 90 includes a matching branch 91 that has one end connected to the second radiation portion 102 and the other end connected to the second feeding point 40 and a third tuning switch 93 that has one end connected to the matching branch 91 and the other end grounded. The matching branch 91 includes a third capacitor C3 and a fifth inductor L5 that are connected in series, the first end of the third capacitor C3 is connected to the second radiation portion 102, the second end of the third capacitor C3 is connected to the third tuning switch 93 and the fifth inductor L5, the first end of the fifth inductor L5 is connected to the third tuning switch 93 and the third capacitor C3, and the second end of the fifth inductor L5 is connected to the second feeding point 40.

The third tuning switch 93 has a sixth inductor-connected state 931, a fourth capacitor-connected state 933, a fifth capacitor-connected state 935 and an open-circuit state 937. Among them, when the third tuning switch 93 is in the sixth inductor-connected state 931, the matching branch 91 is connected to the ground via a sixth inductor L6; when the third tuning switch 93 is in the fourth capacitor-connected state 933, the matching branch 91 is connected to the ground via a fourth capacitor C4; when the third tuning switch 93 is in the fifth capacitor-connected state 935, the matching branch 91 is connected to the ground via a fifth capacitor C5; and when the third tuning switch 93 is in the open-circuit state 937, the matching branch 91 is electrically isolated from the ground.

Figure 6:
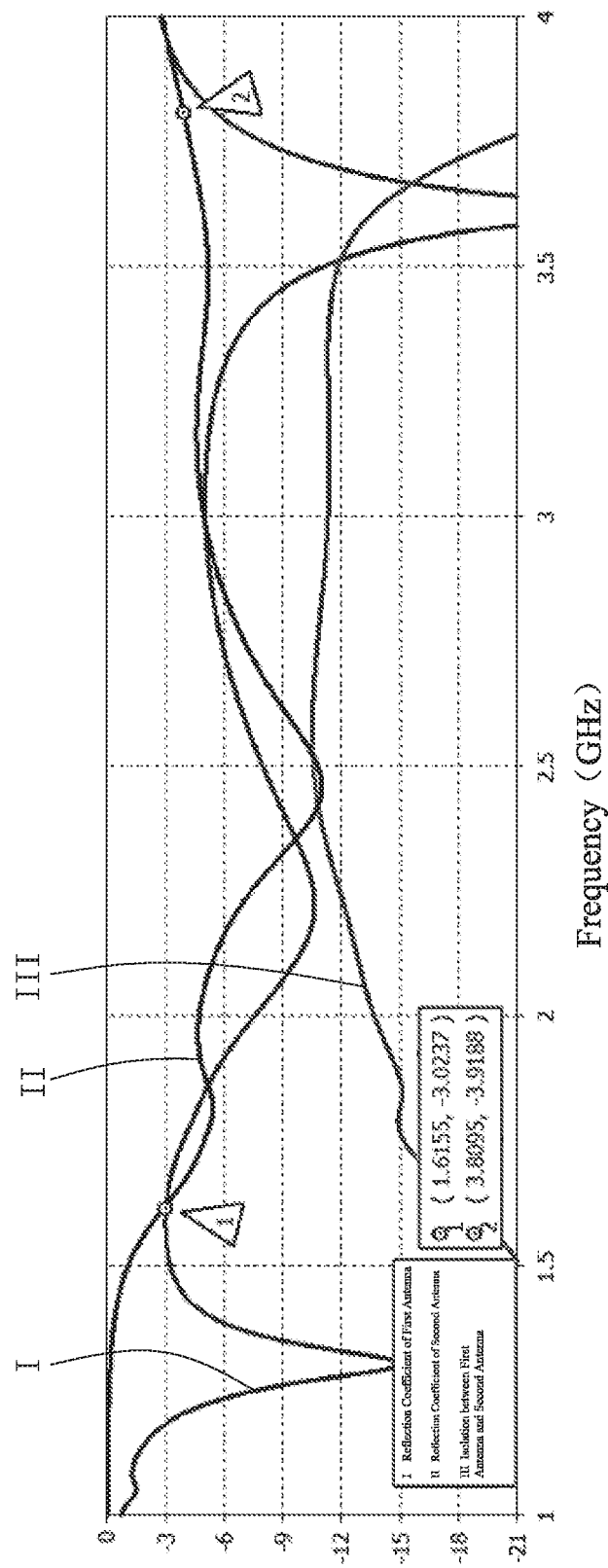
FIG. 6 is a curve diagram of performance simulation of LTE intermediate frequency and high frequency & 3.4-3.8 GHz of the first antenna and a second antenna in the antenna system provided by the present disclosure.
Figure 7:
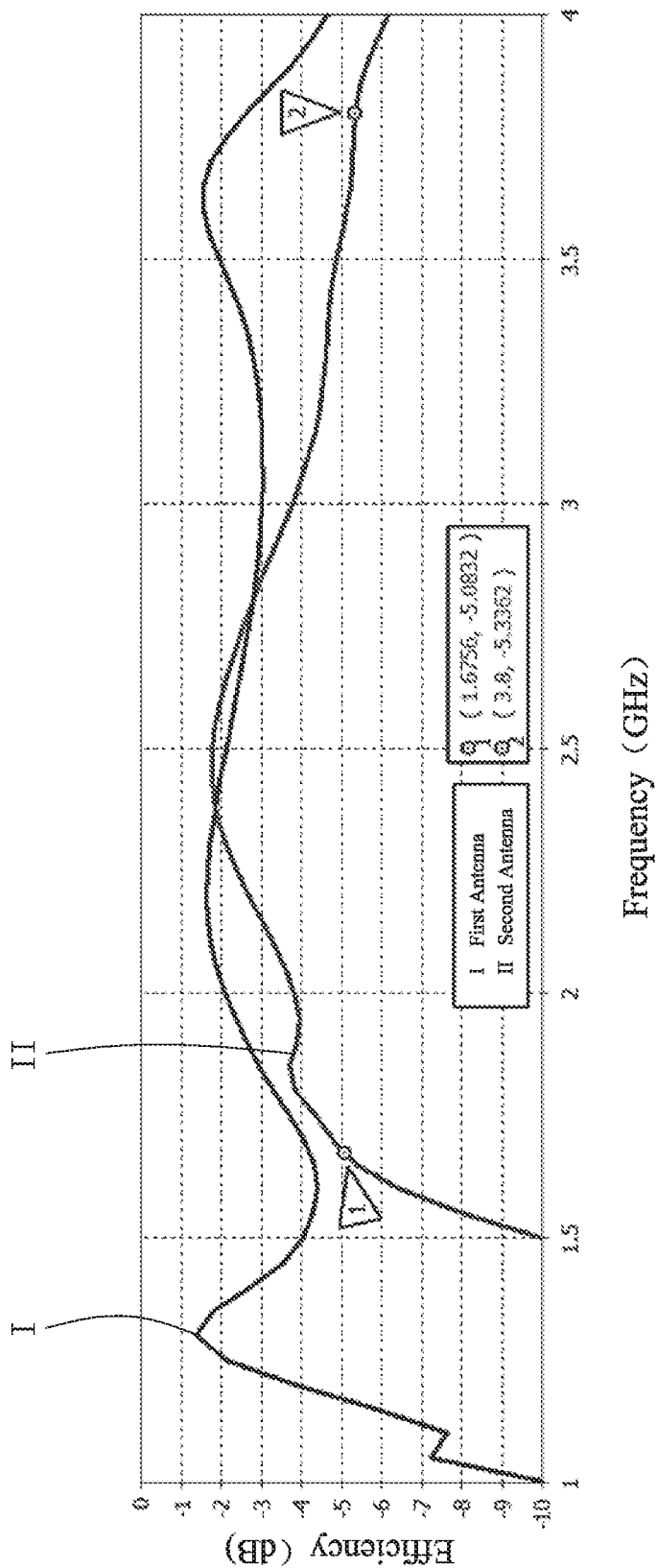
FIG. 7 is a curve diagram of radiation efficiency simulation of LTE intermediate frequency and high frequency & 3.4-3.8 GHz of the first antenna and the second antenna in the antenna system provided by the present disclosure.
Figure 8:
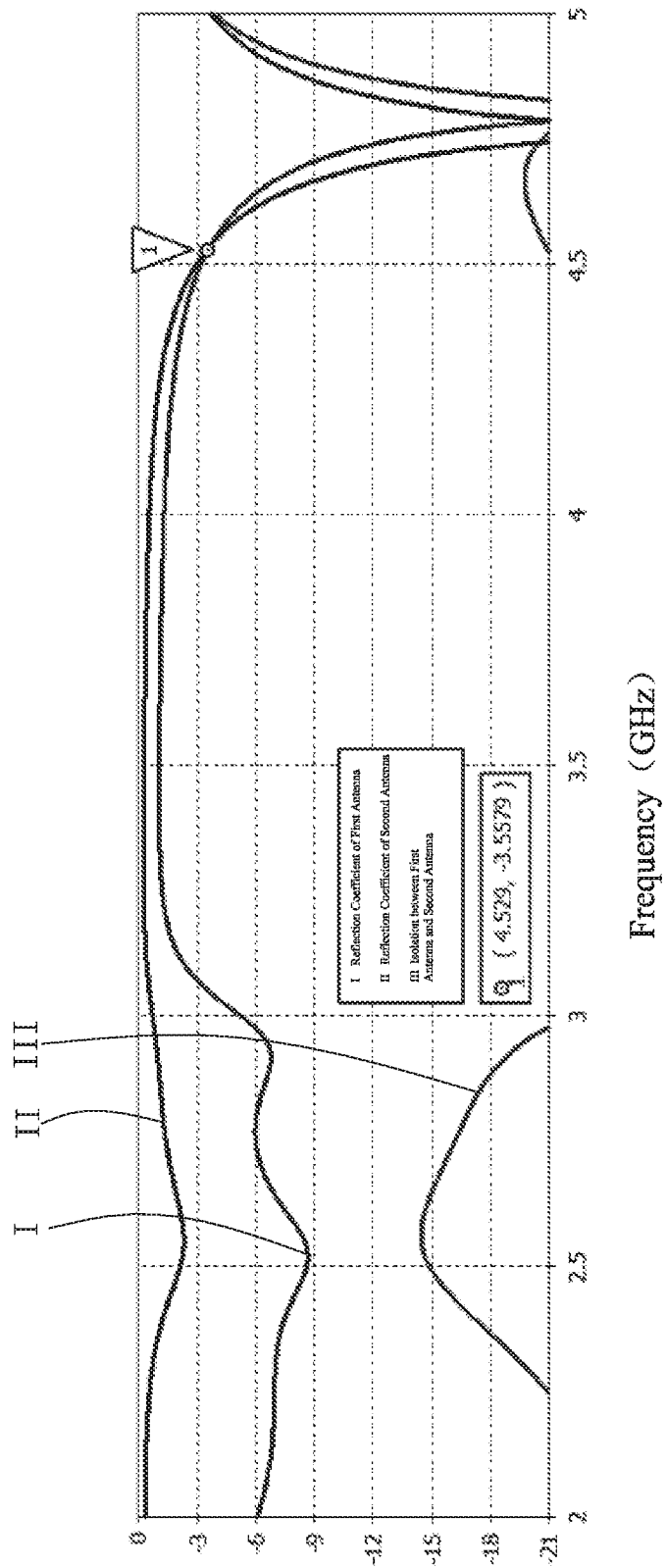
FIG. 8 is a curve diagram of performance simulation of C frequency band of the first antenna and the second antenna in the antenna system provided by the present disclosure.
Figure 9:
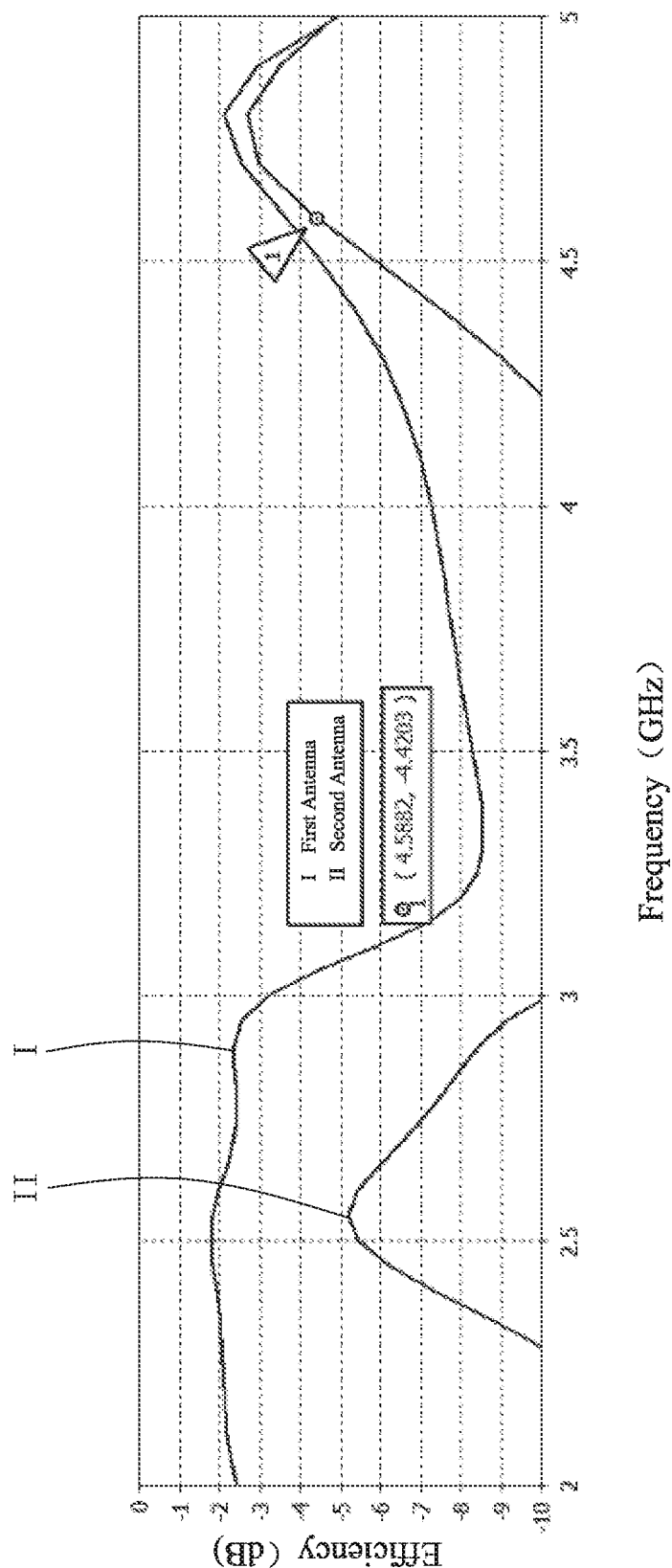
FIG. 9 is a curve diagram of efficiency simulation of C frequency band of the first antenna and the second antenna in the antenna system provided by the present disclosure.

In this embodiment, the reflectance, the isolation and the efficiency of the LTE intermediate frequency and high frequency & 3.4-3.8 GHz of the first antenna and the second antenna are as shown in FIGS. 6 and 7. The reflectance, the isolation and the efficiency of the C frequency band of the first antenna and the second antenna are as shown in FIGS. 8 and 9. In FIGS. 6-9, the unit of the vertical coordinates is dB, and the unit of the horizontal coordinates is GHz.

In this embodiment, the antenna system 100 of the present disclosure realizes the different frequency bands of LTE and 3.4-3.8 GHz & C frequency band by regulating the tuning switches are as follows:

| Frequency | SW1 | SW2 | SW3 |
|---|---|---|---|
| LTE700 (699-803 MHz) | 1.5 nH | 1.5 pF | 0.3 pF |
| LTE800 (791-862 MHz) | 2.2 nH | 0.8 pF | open |
| LTE850 (824-894 MHz) & LTE900 (880-960 MHz) | 5 nH | open | open |
| LTE intermediate frequency and high frequency & 3.4-3.8 GHz (1710 MHz-2690 MHz and 3500 MHz-3700 MHz) | open | 2.2 nH | 0.1 pF |
| C frequency band | open | open | 1.5 nH |

Particularly:

1) when the antenna system is operating at LTE700 (699-803 MHz), the first radiation portion is electrically connected to the second grounding point via a 1.5 nH inductor, the first radiation portion is electrically connected to the first grounding point via a 1.5 pF capacitor, and the matching branch is grounded via a 0.3 pF capacitor;

2) when the antenna system is operating at LTE800 (791-862 MHz), the first radiation portion is electrically connected to the second grounding point via a 2.2 nH inductor, the first radiation portion is electrically connected to the first grounding point via a 0.8 pF capacitor, and the matching branch is electrically isolated from the ground;

3) when the antenna system is operating at LTE850 (824-894 MHz) & LTE900 (880-960 MHz), the first radiation portion is electrically connected to the second grounding point via a 5 nH inductor, the first radiation portion is electrically isolated from the first grounding point, and the matching branch is electrically isolated from the ground;

4) when the antenna system is operating at LTE intermediate frequency and high frequency & 3.4-3.8 GHz (1710 MHz-2690 MHz and 3500 MHz-3700 MHz), the first radiation portion is electrically isolated from the second grounding point, the first radiation portion is electrically connected to the first grounding point via a 2.2 nH inductor, and the matching branch is grounded via a 0.1 pF capacitor; and 5) when the antenna system is operating at C frequency band, the first radiation portion is electrically isolated from the second grounding point, the first radiation portion is electrically isolated from the first grounding point, and the matching branch is grounded via a 1.5 nH inductor.

In conclusion, it can be known that, in the antenna system 100, the first antenna is formed by feeding of the first feeding point 30, the second antenna is formed by feeding of the second feeding point 40, a working frequency of the first antenna is able to cover LTE low frequency, and the working frequencies of the first antenna and the second antenna are able to cover LTE intermediate frequency and high frequency & 3.4-3.8 GHz & C frequency band.

The present disclosure further provides a mobile terminal, wherein the mobile terminal includes the technical features of the above antenna system, and, certainly, also has the above technical effects when adopting the antenna system. The mobile terminal has a size of 80 mm×160 mm, and has a 3D glass screen.

In the antenna system provided by the present disclosure, the bottom frame includes a first slit and a second slit that are oppositely arranged, an breach located between the first slit and the second slit and an extension that extends from one end of the second slit facing away from the breach. A portion of the bottom frame that extends from the breach to the first slit is defined as a first radiation portion, a portion of the bottom frame that extends from the breach to the end of the extension is defined as a second radiation portion. The first feeding point is electrically connected to the first radiation portion, the second grounding point is electrically connected to the first radiation portion via the first tuning switch, and the first grounding point is electrically connected to the first radiation portion via the second tuning switch, to form a first antenna. The second feeding point is electrically connected to the second radiation portion via the matching network, and the second radiation portion is grounded via the connecting rib, to form a second antenna. The first antenna is formed by feeding of the first feeding point, the second antenna is formed by feeding of the second feeding point. A working frequency of the first antenna is able to cover LTE low frequency, working frequencies of the first antenna and the second antenna are able to cover LTE intermediate frequency and high frequency & 3.4-3.8 GHz, and cooperatively operate to form a 2×2MIMO mechanism of working LTE intermediate frequency and high frequency & 3.4-3.8 GHz, and the working frequencies of the first antenna and the second antenna are able to cover C frequency band, and cooperatively operate at a 2×2MIMO mechanism of the C frequency band. The system has multiple frequency and multiple models, and multiple-frequency-band carrier aggregation, which results in a better communication performance.

The above are merely embodiments of the present disclosure. It should be noted here that, a person skilled in the art can make improvements without departing from the inventive concept of the present disclosure, all of which fall within the protection scope of the present disclosure.

What is claimed is:

1. An antenna system, comprising:
a metal frame comprising a bottom frame and a connecting rib;
a mainboard received in the metal frame; and
a first feeding point, a second feeding point, a first grounding point, a second grounding point, a first tuning switch, a second tuning switch and a matching network all arranged on the mainboard,
wherein the bottom frame surrounds the mainboard and forms a clearance region with the mainboard, the connecting rib connects the bottom frame to the mainboard,
wherein the bottom frame comprises a first slit, a second slit opposite to the first slit, a breach located between the first slit and the second slit, and an extension extending from one end of the second slit facing away from the breach,
wherein a portion of the bottom frame extending from the breach to the first slit is defined as a first radiation portion, and a portion of the bottom frame extending from the breach to an end of the extension facing away from the second slit is defined as a second radiation portion
wherein the first feeding point is electrically connected to the first radiation portion, the second grounding point is electrically connected to the first radiation portion via the first tuning switch, and the first grounding point is electrically connected to the first radiation portion via the second tuning switch; and
wherein the second feeding point is electrically connected to the second radiation portion via the matching network, and the second radiation portion is grounded via the connecting rib.

2. The antenna system as described in claim 1, wherein a first antenna is formed by feeding of the first feeding point, a second antenna is formed by feeding of the second feeding point, a working frequency of the first antenna covers LTE low frequency, working frequencies of the first antenna and the second antenna cover LTE intermediate frequency and high frequency & 3.4-3.8 GHz, and the first antenna and the second antenna cooperatively operate to form a 2×2MIMO mechanism of working LTE intermediate frequency and high frequency & 3.4-3.8 GHz, and the working frequencies of the first antenna and the second antenna cover C frequency band, and the first antenna and the second antenna cooperatively operate at a 2×2MIMO mechanism of the C frequency band.

3. The antenna system as described in claim 1, wherein the first tuning switch has a first inductor-connected state, a second inductor-connected state, a third inductor-connected state and an open-circuit state;
  when the first tuning switch is in the first inductor-connected state, the second grounding point is connected to the first radiation portion via a first inductor;
  when the first tuning switch is in the second inductor-connected state, the second grounding point is connected to the first radiation portion via a second inductor;
  when the first tuning switch is in the third inductor-connected state, the second grounding point is connected to the first radiation portion via a third inductor; and
  when the first tuning switch is in the open-circuit state, the second grounding point is electrically isolated from the first radiation portion.

4. The antenna system as described in claim 3, wherein the second tuning switch has a first capacitor-connected state, a second capacitor-connected state, a fourth inductor-connected state and an open-circuit state;
  when the second tuning switch is in the first capacitor-connected state, the first grounding point is connected to the first radiation portion via a first capacitor;
  when the second tuning switch is in the second capacitor-connected state, the first grounding point is connected to the first radiation portion via a second capacitor;
  when the second tuning switch is in the fourth inductor-connected state, the first grounding point is connected to the first radiation portion via a fourth inductor; and
  when the second tuning switch is in the open-circuit state, the first grounding point is electrically isolated from the first radiation portion.

5. The antenna system as described in claim 1, wherein the matching network comprises a matching branch having one end connected to the second radiation portion and the other end connected to the second feeding point and a third tuning switch having one end connected to the matching branch and the other end grounded, the matching branch comprises a third capacitor and a fifth inductor that are connected in series, a first end of the third capacitor is connected to the second radiation portion, a second end of the third capacitor is connected to the third tuning switch and the fifth inductor, a first end of the fifth inductor is connected to the third tuning switch and the third capacitor, and a second end of the fifth inductor is connected to the second feeding point.

6. The antenna system as described in claim 2, wherein the matching network comprises a matching branch having one end connected to the second radiation portion and the other end connected to the second feeding point and a third tuning switch having one end connected to the matching branch and the other end grounded, the matching branch comprises a third capacitor and a fifth inductor that are connected in series, a first end of the third capacitor is connected to the second radiation portion, a second end of the third capacitor is connected to the third tuning switch and the fifth inductor, a first end of the fifth inductor is connected to the third tuning switch and the third capacitor, and a second end of the fifth inductor is connected to the second feeding point.

7. The antenna system as described in claim 3, wherein the matching network comprises a matching branch having one end connected to the second radiation portion and the other end connected to the second feeding point and a third tuning switch having one end connected to the matching branch and the other end grounded, the matching branch comprises a third capacitor and a fifth inductor that are connected in series, a first end of the third capacitor is connected to the second radiation portion, a second end of the third capacitor is connected to the third tuning switch and the fifth inductor, a first end of the fifth inductor is connected to the third tuning switch and the third capacitor, and a second end of the fifth inductor is connected to the second feeding point.

8. The antenna system as described in claim 4, wherein the matching network comprises a matching branch having one end connected to the second radiation portion and the other end connected to the second feeding point and a third tuning switch having one end connected to the matching branch and the other end grounded, the matching branch comprises a third capacitor and a fifth inductor that are connected in series, a first end of the third capacitor is connected to the second radiation portion, a second end of the third capacitor is connected to the third tuning switch and the fifth inductor, a first end of the fifth inductor is connected to the third tuning switch and the third capacitor, and a second end of the fifth inductor is connected to the second feeding point.

9. The antenna system as described in claim 5, wherein the third tuning switch has a sixth inductor-connected state, a fourth capacitor-connected state, a fifth capacitor-connected state and an open-circuit state;
  when the third tuning switch is in the sixth inductor-connected state, the matching branch is connected to the ground via a sixth inductor;
  when the third tuning switch is in the fourth capacitor-connected state, the matching branch is connected to the ground via a fourth capacitor;
  when the third tuning switch is in the fifth capacitor-connected state, the matching branch is connected to the ground via a fifth capacitor; and
  when the third tuning switch is in the open-circuit state, the matching branch is electrically isolated from the ground.

10. The antenna system as described in claim 6, wherein the third tuning switch has a sixth inductor-connected state, a fourth capacitor-connected state, a fifth capacitor-connected state and an open-circuit state;
  when the third tuning switch is in the sixth inductor-connected state, the matching branch is connected to the ground via a sixth inductor;
  when the third tuning switch is in the fourth capacitor-connected state, the matching branch is connected to the ground via a fourth capacitor;
  when the third tuning switch is in the fifth capacitor-connected state, the matching branch is connected to the ground via a fifth capacitor; and
  when the third tuning switch is in the open-circuit state, the matching branch is electrically isolated from the ground.

11. The antenna system as described in claim 7, wherein the third tuning switch has a sixth inductor-connected state, a fourth capacitor-connected state, a fifth capacitor-connected state and an open-circuit state;
  when the third tuning switch is in the sixth inductor-connected state, the matching branch is connected to the ground via a sixth inductor;
  when the third tuning switch is in the fourth capacitor-connected state, the matching branch is connected to the ground via a fourth capacitor;
  when the third tuning switch is in the fifth capacitor-connected state, the matching branch is connected to the ground via a fifth capacitor; and when the third tuning switch is in the open-circuit state, the matching branch is electrically isolated from the ground.

12. The antenna system as described in claim 8, wherein the third tuning switch has a sixth inductor-connected state, a fourth capacitor-connected state, a fifth capacitor-connected state and an open-circuit state;
   when the third tuning switch is in the sixth inductor-connected state, the matching branch is connected to the ground via a sixth inductor;
   when the third tuning switch is in the fourth capacitor-connected state, the matching branch is connected to the ground via a fourth capacitor;
   when the third tuning switch is in the fifth capacitor-connected state, the matching branch is connected to the ground via a fifth capacitor; and
   when the third tuning switch is in the open-circuit state, the matching branch is electrically isolated from the ground.

13. The antenna system as described in claim 1, wherein the metal frame comprises a top frame opposite to and spaced apart from the bottom frame and two middle frames having two ends respectively connected to the bottom frame and the top frame, the bottom frame comprises a main frame and two side frames that extend from two ends of the main frame while being bent towards the two middle frames, one of the two side frames that are arranged opposite to the extension is spaced apart from one of the two middle frames to form the first slit, one end of the extension is spaced apart from one of the two side frames close thereto to form the second slit, the other end of the extension is connected to the two middle frames, and the breach is arranged at the main frame and is arranged close to the second slit.

14. The antenna system as described in claim 13, wherein the first feeding point is connected to a first position of the main frame, the first grounding point is connected to a second position of the main frame, the second grounding point is connected to a third position of the main frame, the second feeding point is connected to a fourth position of the extension, the first position is located between the second position and the third position, the second position is located between the first slit and the first position and is close to the first position, the third position is located between the first position and the breach, and the connecting rib is connected to the main frame and is located between the breach and the second slit.

15. The antenna system as described in claim 14, wherein a clearance region formed by the extension and the mainboard is smaller than clearance regions formed by other parts of the bottom frame and the mainboard.

16. A mobile terminal, comprising the antenna system as described in claim 1.

17. A mobile terminal, comprising the antenna system as described in claim 2.

* * * * *